United States Patent [19]

Ito et al.

[11] Patent Number: 5,440,372
[45] Date of Patent: Aug. 8, 1995

[54] DIGITAL COPIER SYSTEM

[75] Inventors: Norifumi Ito, Kawasaki; Jun Doi, Yokohama, both of Japan

[73] Assignee: Ricoh Company, Ltd., Tokyo, Japan

[21] Appl. No.: 247,757

[22] Filed: May 23, 1994

[30] Foreign Application Priority Data

Jun. 11, 1993 [JP] Japan .................. 5-140605

[51] Int. Cl.⁶ .................................. G03G 15/00
[52] U.S. Cl. .................. 355/204; 358/401; 355/208
[58] Field of Search ............... 355/204, 208, 319; 346/160; 358/400, 401

[56] References Cited

U.S. PATENT DOCUMENTS

| | | | |
|---|---|---|---|
| 5,016,114 | 5/1991 | Sakata et al. ............ | 358/401 X |
| 5,049,929 | 9/1991 | Anderson et al. ......... | 355/204 |
| 5,105,284 | 4/1992 | Sakata et al. ............ | 358/401 X |
| 5,361,134 | 11/1994 | Hu et al. ................ | 358/401 X |

*Primary Examiner*—R. L. Moses
*Attorney, Agent, or Firm*—Oblon, Spivak, McClelland, Maier & Neustadt

[57] ABSTRACT

In a digital copier system wherein a plurality of applications share a plurality of resources, a system controller executes exclusive control with duplex copy unit requests sent from a plurality of applications, thereby allowing only one application to use a duplex copy unit. This guarantees the consistency of the system by eliminating problems attributable to a decision on the duplex copy unit which differs from one application to another application. Further, when a paper or papers are left on the unit after a certain application has occupied the unit for more than a predetermined period of time, the system forcibly discharges them from the unit and causes the application to release the right to use the unit.

2 Claims, 7 Drawing Sheets 5,440,372

DIGITAL COPIER SYSTEM

BACKGROUND OF THE INVENTION

The present invention relates to a digital copier system of the type converting a document image to an electric signal and reproducing it with an image forming device and, more particularly, to a digital copier system wherein a plurality of applications share resources.

Generally, a digital copier of the type described transforms a document image to an electric signal executes various kinds of image processing with the electric signal, or image signal, and then causes an image forming device to reproduce the document image represented by the processed image signal. This type of copier can be provided with various kinds of applications. e.g., facsimile application, printer application, scanner application, and file system application. Then, the applications will share the resources available in the copier, e.g., image reading device, image forming device, operation and display panel, memory, and peripheral units. The peripheral units include a document feeder (DF) and a sorter.

However, the problem with the digital copier described above is that it is implemented as a single task system wherein a plurality of applications share the resources. This kind of system prevents a plurality of users to use the applications at the same time. For example, when a person is operating the copier to produce copies, another person cannot use the printer application unless the person waits until the copying operation has been completed or interrupted. While only the printer application is in use, facsimile transmission using the facsimile application cannot be effected until the printer output has been completed or interrupted, despite that the facsimile application is capable of sending facsimile data by using the image reading device.

In light of this, there has been proposed a multitask type digital copier system which allows the copier, printer, facsimile and other applications to share and selectively use the image reading device, image forming device and other resources.

Assume that a digital copier of the type described includes a duplex copy unit capable of turning over a paper to which an image has been transferred from a photoconductive element included in, for example, an electrophotographic image forming device, and again feeding it to the photoconductive element. With the duplex copy unit, it is possible to form an image on both sides of a single paper. The duplex copy unit is also shared by the applications. However, the problem is that the decision as to whether or not the duplex copy unit is usable differs from one application to another, preventing the system from having consistency.

SUMMARY OF THE INVENTION

It is, therefore, an object of the present invention to provide a digital copier system which achieves consistency by eliminating drawbacks attributable to the decision which differs from one application to another application.

In accordance with the present invention, in a multitask type digital copier system in which a plurality of applications, including copier, printer and facsimile applications, share and selectively use a plurality of resources, including an image reading device, an image forming device and a duplex copy unit, requests for using the duplex copy unit from a plurality of applications are subjected to exclusive control to thereby allow only one of the applications to use the duplex copy unit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
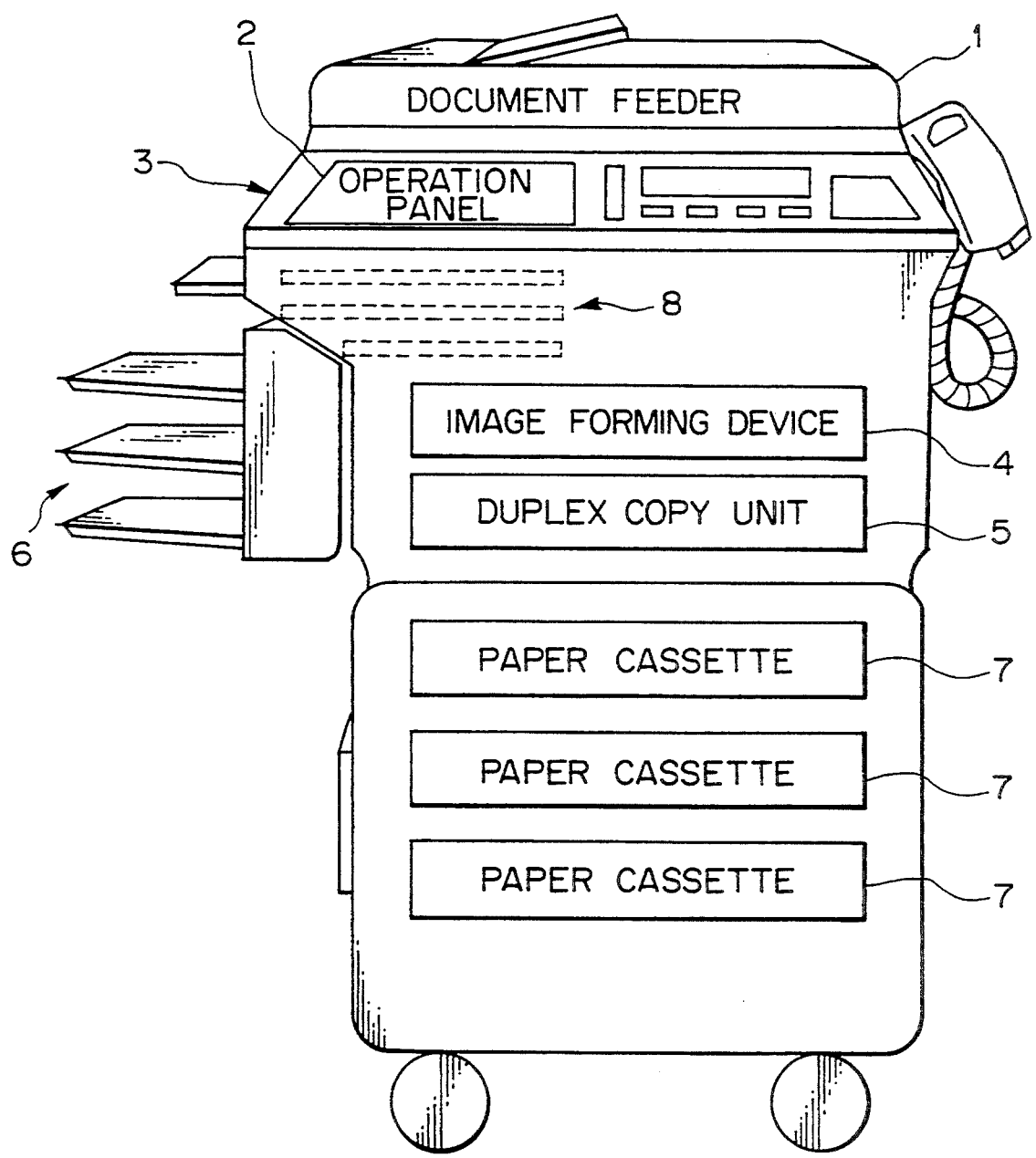
FIG. 1 schematically shows the general construction of a digital copier system embodying the present invention.

Referring to FIG. 1 of the drawings, a digital copier system embodying the present invention is shown. As shown, the system includes a document feeder 1 and an operation (and display) panel 2. After desired conditions have been entered on the operation panel 12, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Figure 2:
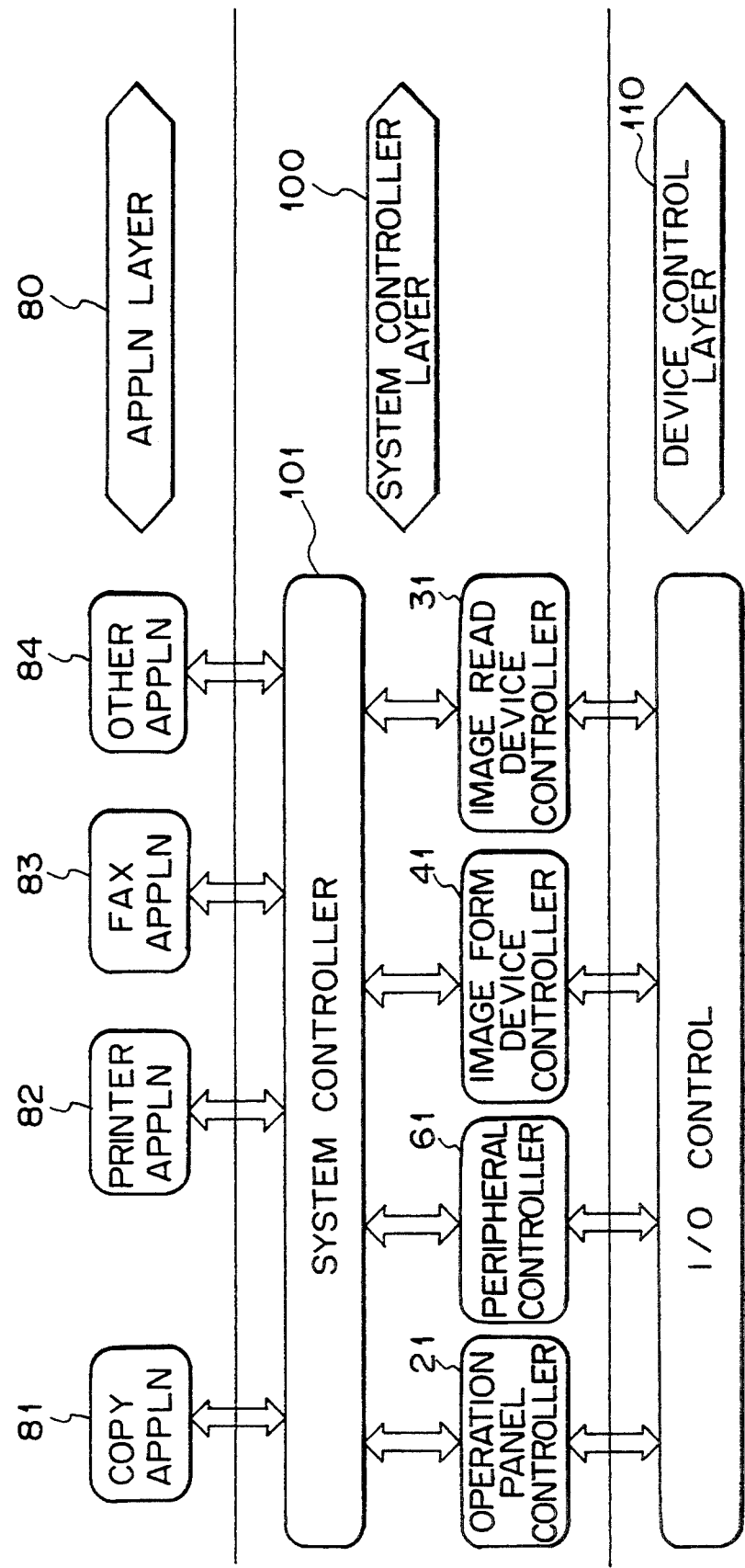
FIG. 2 is a block diagram schematically showing the embodiment.

Applications, generally 8, share the document feeder 1, operation panel 2, image reading device 3, image forming device 4, duplex unit 5, sorter 6, and paper cassettes 7 which are the resources built in the copier system. Specifically, as shown in FIG. 2, the applications include a copier application 81, a printer application 82, a facsimile (FAX) application 83, and other applications 84.

In the following description, let the electric signal or image signal output from the image reading device 3, an image signal input to the image forming device 4, and a synchronizing signal associated with the image signals be collectively referred to as a video signal. Signals for causing the reading device 3, image forming device 4 and applications 81-84 to interchange the video signal will be referred to as control signals or commands. Further, the word "system" should be understood to mean the digital copier having a plurality of applications 81-84, as stated above. A controller for controlling the system will be called a system controller.

The operation panel 2 is, in many cases, provided with an extremely limited capacity even when the system is loaded with a plurality of applications 81-84. In such a case, the operation panel 2 has to be given up for a desired application. In this sense, pictures each being assigned to a particular application will be referred to as virtual pictures. Although a plurality of virtual pictures exist, only one of them appears on the panel 2 at a time.

The application allowed to occupy the operation panel 2 will be called a foreground application. Substantially all the key inputs from the system are reported to the foreground application, while only the virtual picture of the foreground application appears on the panel 2. Let the other applications not occupying the panel 2 be referred to as background applications. Although the background applications cannot occupy the panel 2, they do not stop operating; only limited key inputs are reported thereto from a system controller 101. It follows that while the image forming device 4 is idle, the printer application 82, for example, can access the image forming device 4 when supplied with print data from a host personal computer, not shown, despite that it is a background application.

The system controller 101 supervises each of the resources 1-7 as to the idle or unoccupied state. The application entitled to use the operation and display panel 2 first by the system controller 101 when the power source of the system is turned on will be referred to as a start-up application.

Words "insertion output" or "interleave", which will be used in relation mainly to the output of an image, will be described. Conventional single task type image output is not effected by an operation other than an operation under way, i.e., until a sequence of cycles having the same purpose, i.e., a single job completes. For example, advanced digital copiers have multiplex functions, i.e., copying function and facsimile or printer function as well as other functions. Most of them execute output on a function (job) basis such that the copying function, for example, is followed by a printer output when it completes. By contrast, in the illustrative embodiment, inserting one job output in another job output is referred to as "interleave". For example, the embodiment implements printer output during the course of copier output without stopping the machine.

A word "mode" is indicative of a condition wherein a given application is entitled to display. For example, when the printer application 82 has a right to display, the digital copier will be described as being in a printer mode. The transition from one mode to another mode is controlled by the system controller 101.

As the system becomes complicated, the applications have to be adaptive to each user. However, it is impractical to satisfy all the users' needs at the time of shipment. The only measure left is dealing with the applications after the system has been put on the market. In light of this, the embodiment includes a nonvolatile RAM (Random Access Memory) and has a user-oriented system setting function. Let this function be referred to as user setting hereinafter.

When the image forming device 4 is implemented by an electrophotographic process using a laser beam, the writing density is selectable over a certain range. This function will be expressed as variable resolution (VR) or multiresolution (MR) hereinafter, further, in this type of copier, the number of supplies are too great to allow all the persons to use the copier limitlessly. Limiting the persons who can use the copier will be referred to as user limitation. To specify, limit and supervise the users, use is made of a coin rack, key counter, key card, private code, or similar implementation.

In the multitask type system architecture wherein the applications 81 share the resource 1-7, the system is controlled by a system control layer 100, as shown in FIG. 2. The system control layer 100 has, in addition to the system controller 101, an operation panel controller 21, an image reading device controller 31, an image forming device controller 41, and a sorter controller 61. A device control layer 110 transforms commands, control signals and other logical commands from the system control layer 100 to corresponding signals for driving and inputting mechanical inputs and outputs which actually drive the devices, e.g., clutches, sensors and motors. The applications 81-84 coexist in an application layer 80 due to the function provided by the system control layer 100.

Figure 3:
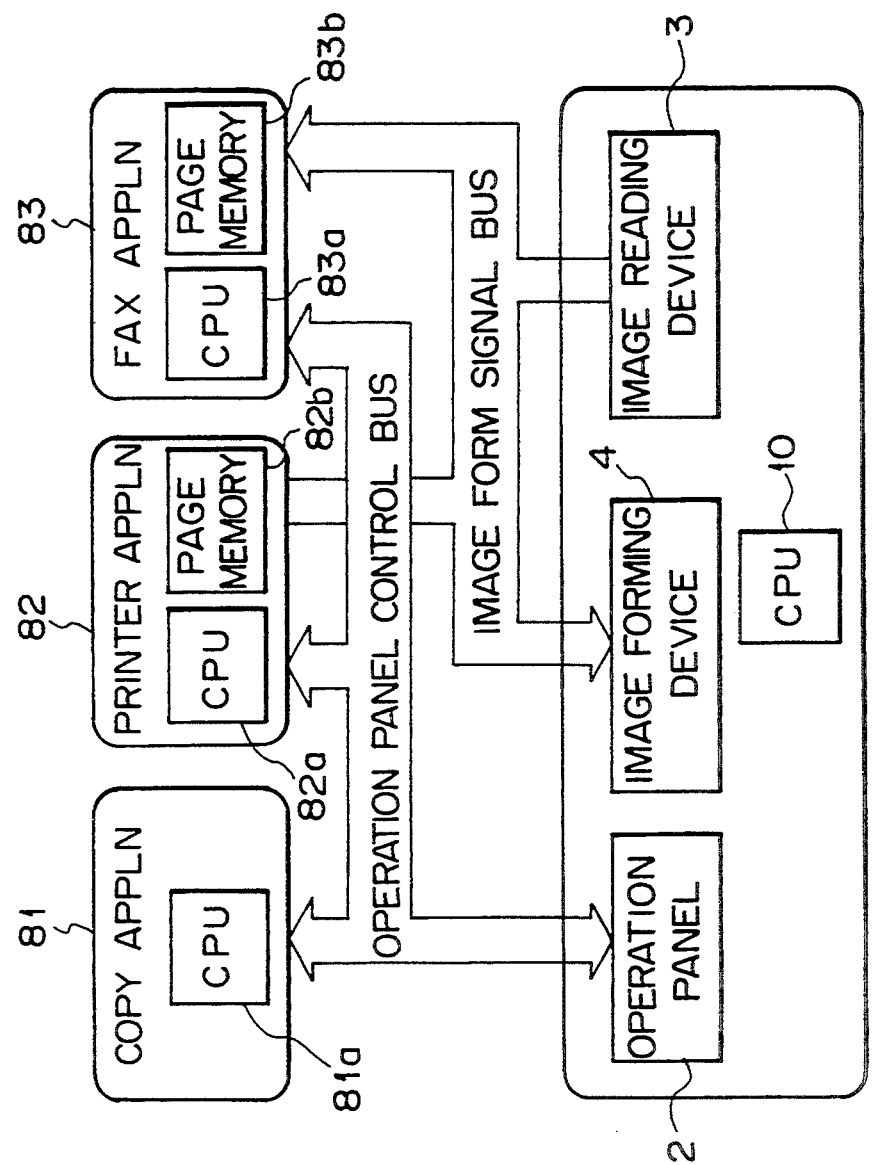
FIG. 3 is a schematic block diagram of a specific hardware architecture included in the embodiment.

FIG. 3 shows a specific hardware architecture implementing the system. As shown, CPUs (Central Processing Units) 81a, 82a and 83a are assigned to the applications 81, 82 and 83, respectively. A single CPU 10 is assigned to the image reading device 3 and image forming device 4. The single CPU 10, therefore, can control both the system control layer 100 and the device control layer 110. The printer application 82 and facsimile application 83 are provided with page memories 82b and 83b, respectively. In FIG. 3, as well as in FIGS. 4-7 to follow, the other applications 84 are not shown.

Figure 4:
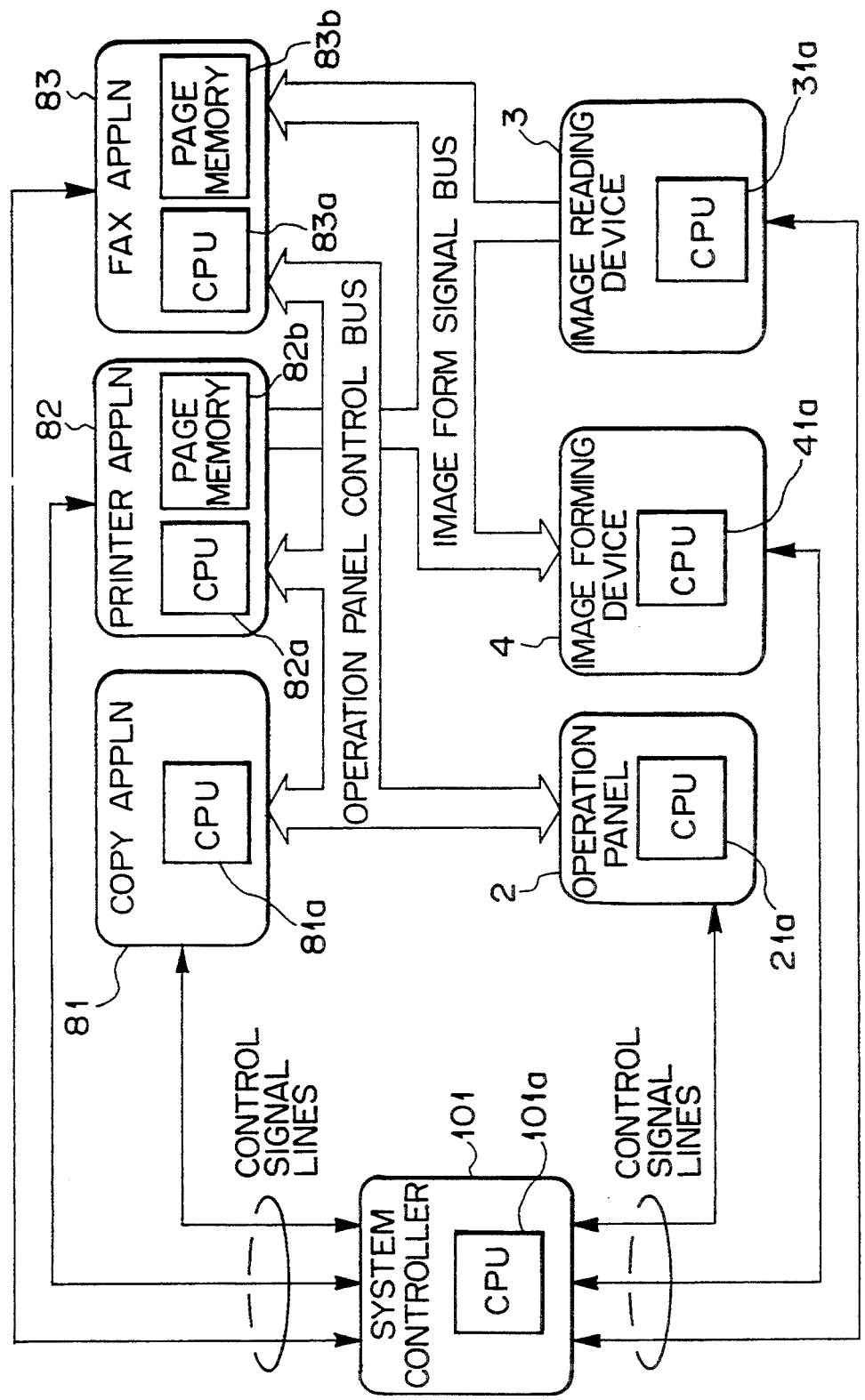
FIG. 4 is a schematic block diagram showing another specific hardware architecture.

FIG. 4 shows an alternative hardware architecture. As shown, CPUs 81a-83a, 101a, 21a, 31a and 41a are respectively included in the system controller 101 and resource 2-4. Commands from the CPU 101a of the system controller 101 are transferred to the CPUs 81a-83a and 21a-41a over respective control signal lines. In this way, the illustrative embodiment is practicable with various kinds of hardware arrangements.

Figure 5:
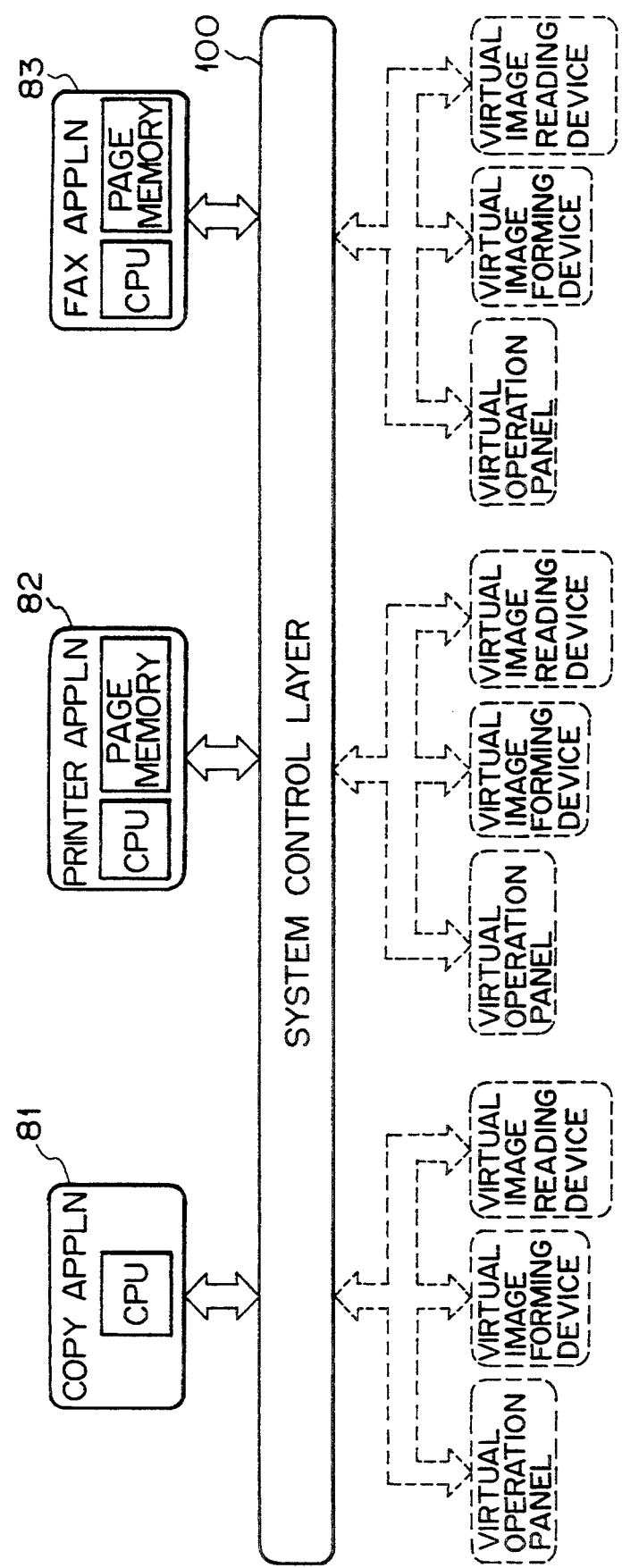
FIG. 5 is a schematic block diagram representative of a relation between an application layer and a system control layer included in the embodiment.

A reference will be made to FIGS. 5-7 for describing virtual resources particular to the embodiment. The system control layer 100 implements a function appearing, as seen from the application layer 80, as if virtual resources were assigned to all the applications 81-84, as indicated by dotted blocks in FIG. 5. As a result, it is not necessary for the application layer 80 to supervise system conditions, i.e., the system control layer 100 can supervise all the applications under the same conditions. Specifically, when one of the applications 81-84 desires to occupy a certain resource, it sends a request to the system control layer 100. In response, the system control layer 100 returns to the application a result of decision relating to the status of the resource of interest.

Then, the application sees whether or not it can use the resource and uses it if possible. Basically, the system control layer 100 deals with the execution rights of the applications 81–84 by the same procedure.

The actual resources 2–4 are provided one each, as shown in FIG. 1. Hence, when requests for using the virtual resources conflict, the system control layer 100 has to perform exclusive control or time division assignment in order to transfer the actual right to use the resources 2–4. Which of the exclusive control and time division assignment should be executed depends on the kind of the resource and previously mentioned user setting.

Figure 6:
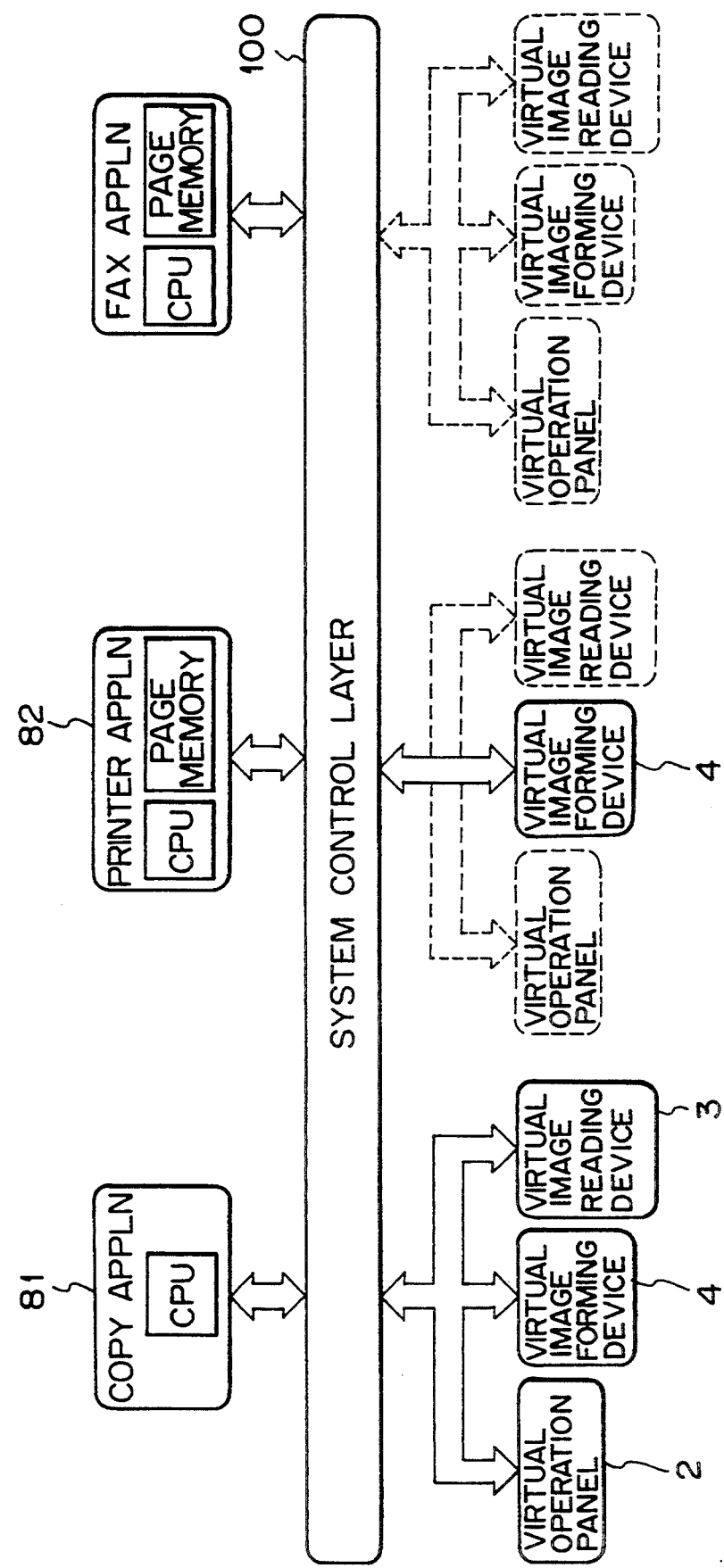
FIG. 6 is a schematic block diagram demonstrating an interleave operation to be performed by a copy application and a printer application loaded in the embodiment.
Figure 7:
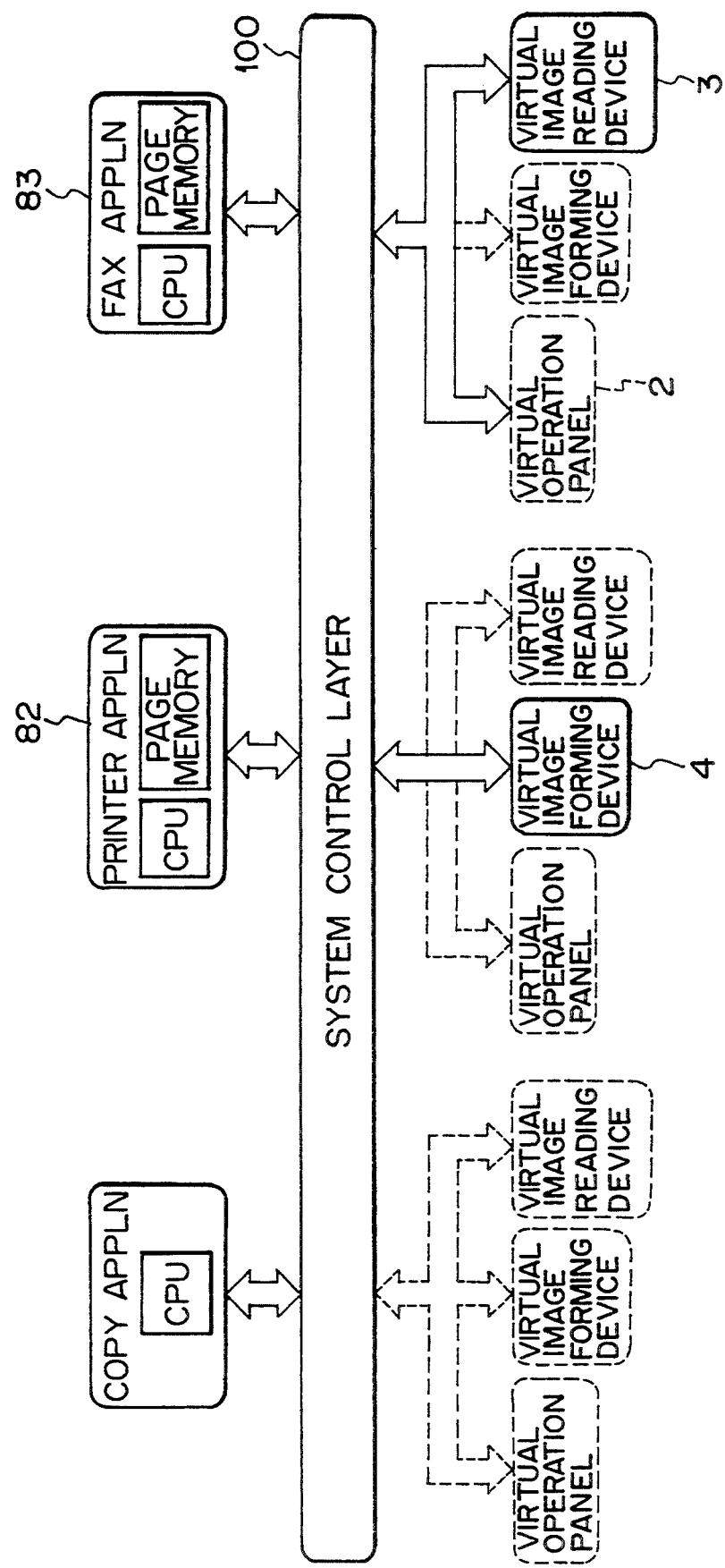
FIG. 7 is a schematic block diagram indicative of the parallel operations of the printer application and a facsimile application which is also loaded in the embodiment.

In FIGS. 6 and 7, the virtual resources indicated by dotted lines show that the associated application does not have the right to execute them, while the virtual resources indicated by solid lines show that it has the right to execute them. FIG. 6 demonstrates a specific operation in which the copy application 81 and printer application 82 operate in the interleave mode, i.e., one job output is inserted in another job output, as stated earlier. In the condition of FIG. 6, the copy application 81 has the right to occupy and is occupying all the resources of the reading device 3 and image forming device 4. When the printer application 82 sends a request for using the image forming device 4 and if the interleave mode is set up by user setting, the system control layer 100 assigns the image forming device 4 to the applications 81 and 82 on a time division basis.

The time division assignment stated above allows the resource execution right to be dynamically transferred from one application to another application. As a result, the outputs of the applications 81 and 82 are produced from the image forming device 4 together without the device 4 stopping operating. This is successful in minimizing the waiting times of the applications 81 and 82.

FIG. 7 demonstrates another specific operation in which the printer application 92 and facsimile application 83 operate in parallel. In the event of transmission, the facsimile application 83 uses only the operation panel 2 and image reading device 3 while the printer application 82 needs only the image forming device 4. Therefore, despite that the two applications 82 and 83 send resource requests at the same time, the resources do not conflict. In this condition, the requests from the applications 82 and 83 can be accepted without the exclusive control or the time division assignment, implementing facsimile transmission and printer output at the same time.

How the system control layer 100 supervises the duplex copy unit 5 will be described. To begin with, the system control layer 100 deals with the requests for using the duplex copy unit 5 from the applications 81–84 by the exclusive control, thereby allowing only one application to occupy the unit 5. This guarantees the consistency of the system by obviating the decision which differs from one application to another application. Before the application obtained the right to use the duplex copy unit 5 releases it, the other applications are inhibited from using the unit 5. The applications, therefore, can each occupy the duplex copy unit 5 over a particular period of time. For example, assume the copy application 81 lacking means for storing image data generated by the reading device 3, as shown in FIGS. 3–7. Then, when the number of papers driven into the unit 5 is smaller than the number of papers driven out of the unit 5 due to, for example, a jam occurred during duplex copy mode operation, it is necessary for the copy application 81 to occupy the unit 5 continuously in order to allow the documents to be returned.

On the other hand, the printer application 82 and facsimile application 83 have page memories 82b and 83b, respectively. In this case, it is not necessary to return the documents. Therefore, the applications 82 and 83 each releases the right to use the duplex copy unit 5 as soon as the last paper is fed. As a result, the period of time over which the copy application 81 cannot use the unit 5 is reduced. An arrangement may be made such that when a certain application has occupied the duplex copy unit 5 for more than a predetermined period of time and papers are left in the unit 5, such papers are forcibly discharged as blank papers while the application is forced to release the right. Specifically, if the application entitled to use the unit 5 does not release the right, the other applications cannot use the unit 5 permanently. Particularly, when the printer application 82, which is often executed without a person standing by the system, occupies the unit 5 continuously, it will bother a user intending to produce duplex copies. By causing the application to release the right on the elapse of a predetermined time, it is possible to eliminate such a problem.

The duplex copy unit 5 may be so constructed as to stack a plurality of papers thereon, as in a conventional copier. In this case, when a paper or papers are left on the unit 5 after refeed has been performed the number of times corresponding to the number of papers driven into the unit 5, they are forcibly driven out as blank papers while the application occupying the unit 5 is caused to release the right. Should the application having used the unit 5 be replaced with the next application with papers left in the unit 5, the probability of a jam would increase when the paper size is different.

If an arrangement is made such that the application released the right to use the duplex copy unit 5 determines whether or not papers are left in the unit 5, an error will directly translate into the above-stated occurrence. This problem can be eliminated if the system controller 101 forcibly discharges papers, if present in the unit 5 when the application occupying the unit 5 releases the right, as blank papers, thereby resorting the unit 5 to the usable state.

When an error occurs in the application using the duplex copy unit 5, the system controller 101 may forcibly discharge papers left in the unit 5 and restore the unit 5 to the usable state. This prevents the unusable state of the unit 5 from continuing. Furthermore, if the application determined that it cannot use the unit 5 has display means, a selection inhibition state may be set up to inform the user of the fact that the unit 5 is in use. Then, while the printer application 82, for example, is in use, a person will be prevented from inadvertently pulling out the unit 5 from the copier.

In summary, it will be seen that the present invention provides a digital copier system having a system control controller which executes exclusive control with duplex copy unit requests from a plurality of applications, thereby allowing only one application to use the unit. This guarantees the consistency of the system by eliminating problems attributable to the decision on the duplex copy unit which differs from one application to another application. Further, when a paper or papers are left on the unit after a certain application has occupied the unit for more than a predetermined period of time, the system forcibly discharges them from the unit and causes the application to release the right to use the unit. Hence, another application can use resources within a short period of time.

Various modifications will become possible for those skilled in the art after receiving the teachings of the present disclosure without departing from the scope thereof.

What is claimed is:

1. In a multitask type digital copier system in which a plurality of applications, including copier, printer and facsimile applications, share and selectively use a plurality of resources, including an image reading device, an image forming device and a duplex copy unit, requests for using said duplex copy unit from a plurality of applications are subjected to exclusive control to thereby allow only one of said applications to use said duplex copy unit.

2. A system as claimed in claim 1, wherein when any one of said plurality of applications has occupied said duplex copy unit for more than a predetermined period of time and a paper is left in said duplex copy unit, said system forcibly discharges said paper from said duplex copy unit as a blank sheet and causes the one application to release a right to use said duplex copy unit.

* * * * *